W. McKAY.
Improvement in Fish-Bait Mills.

No. 129,576.

Patented July 16, 1872.

Witnesses.

William McKay
by his attorney 129,576

UNITED STATES PATENT OFFICE.

WILLIAM McKAY, OF NEWBURYPORT, MASSACHUSETTS.

IMPROVEMENT IN FISH-BAIT MILLS.

Specification forming part of Letters Patent No. 129,576, dated July 16, 1872.

*To all persons to whom these presents may come:*

Be it known that I, WILLIAM McKAY, of Newburyport, of the county of Essex and State of Massachusetts, have invented a new and useful or improved mill or machine for reducing Fish or other animal matter for being used as bait or otherwise; and I do hereby declare the same to be fully described in the following specification and represented in the accompanying drawing, of which—

Figure 1:
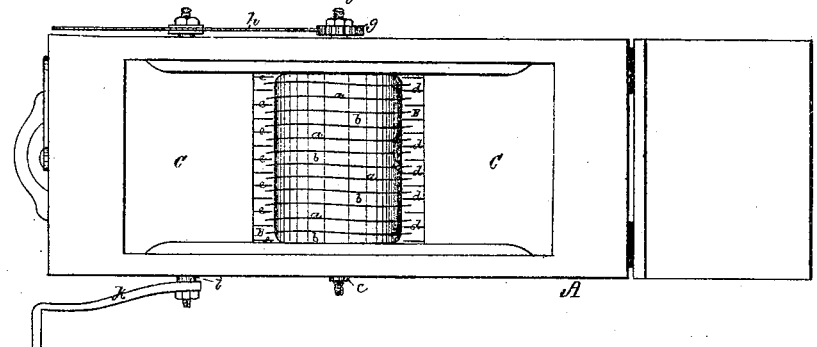
Figure 2:
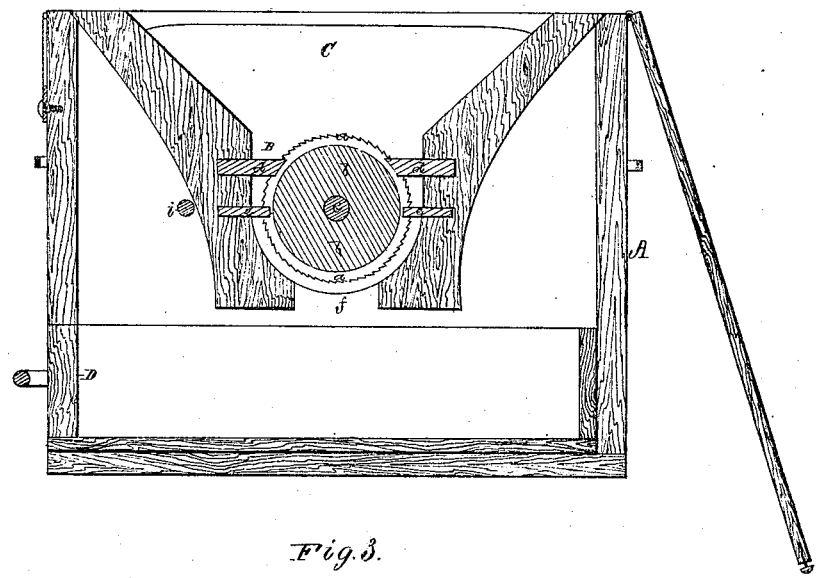
Figure 3:
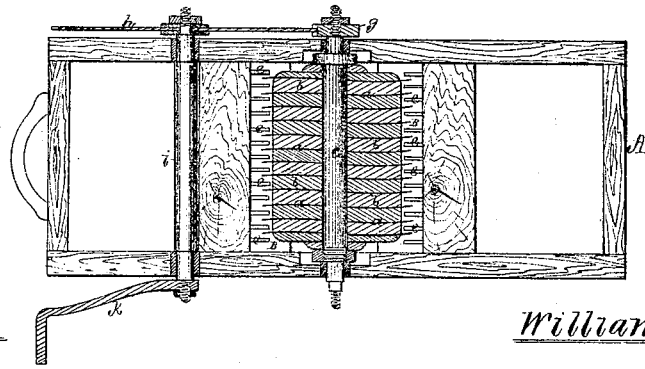

Figure 1 is a top view, Fig. 2 a longitudinal section, and Fig. 3 a horizontal section, of the said mill as it appears with its cover off the hopper.

In the drawing, *a a a a*, &c., denote a series of circular saws, arranged at short distances apart, and with a series of disks, *b b b b*, &c., and upon a shaft, *c*, in manner as shown. Each saw, when projecting beyond the holding-disks, is bent more or less obliquely or in a serpentine form, in order that, while revolving between the teeth or studs, it may have more or less of endwise motion. The rotary serrated cutter so made is placed within a chamber, B, whose opposite sides are studded with knives or studs *d d d e e e* arranged, as shown, so that the saws shall play between such studs. The chamber has an opening, *f*, through its bottom, and at top opens into a hopper, C, arranged over it, as represented. The shaft of the rotary cutter goes through the sides of the cutting-chamber, is pivoted therein, and, besides, is provided with a pinion, *g*, to engage with a driving-gear, *h*. This latter gear is fixed upon a shaft, *i*, provided with a crank, *k*, all being arranged as represented. Within the box or frame A of the machine is a drawer, D, which is arranged beneath the educt of the cutting-chamber, and receives the bait or reduced material discharged from the serrated cutter.

On the hopper being supplied with fish or meat to be reduced, and the crank being revolved, the rotary cutter or series of saws will be put in movement, and, by operating with the studs, will reduce the fish or meat to very small pieces. The saws, if without the obliquities or heads, as stated, will reduce the fish or meat, but with them they will produce the result far better and more rapidly, as with them each saw while revolving moves or parts of it move more or less laterally, and consequently while the meat or fish is supported or held on or by the teeth or studs it will be cut to better advantage than it would were the saw a straight or plain disk without any heads or deflections when projecting beyond the supporting-disks.

Bait-mills as generally made have a rotary cutter-cylinder furnished with radial knives to operate with stationary studs or knives projecting from the sides of the reducing-chamber in which the cutter-cylinder may be. I have found that circular saws operate much better than knives, and especially when the saws are more or less oblique or bent laterally when projecting beyond the holding-disks. Bait-mills have also been constructed of toothed disks provided with triangular-hooked teeth, such construction being as shown in the United States Patents No. 18,929 and 35,472. I make no claim to such mills, as neither of such constructions involves saw-blades bent or arranged more or less obliquely or laterally, in manner as hereinbefore described; therefore,

I claim—

In the bait-mill described, the circular saws arranged and combined together and with the studs of the cutter-chamber as set forth, and bent or arranged more or less obliquely or laterally where projecting beyond the holding-disks, all being as and to operate substantially as specified.

WILLIAM McKAY.

Witnesses:
CHAS. E. BAYLEY,
C. W. PIKE.